UNITED STATES PATENT OFFICE.

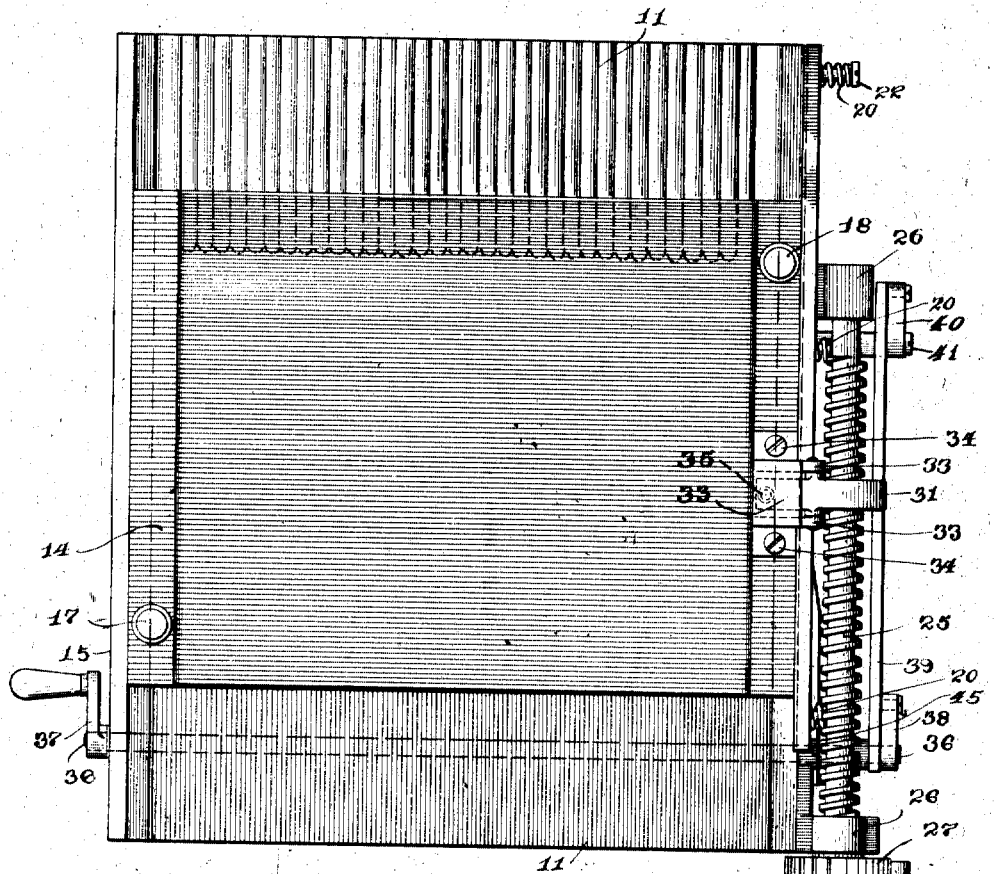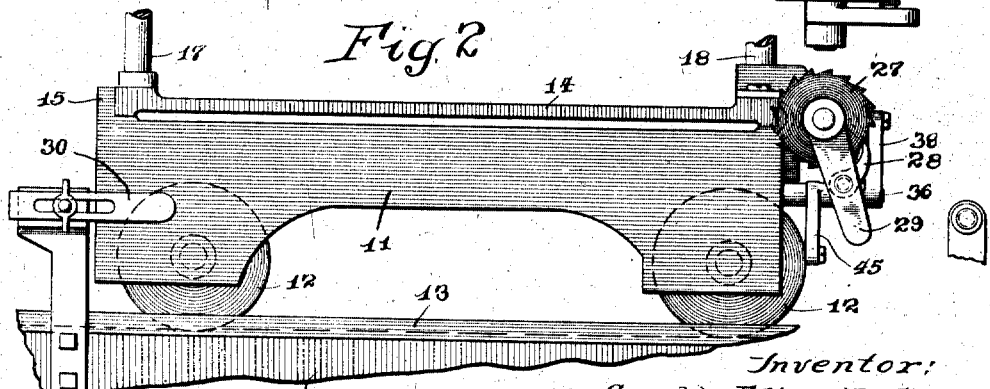

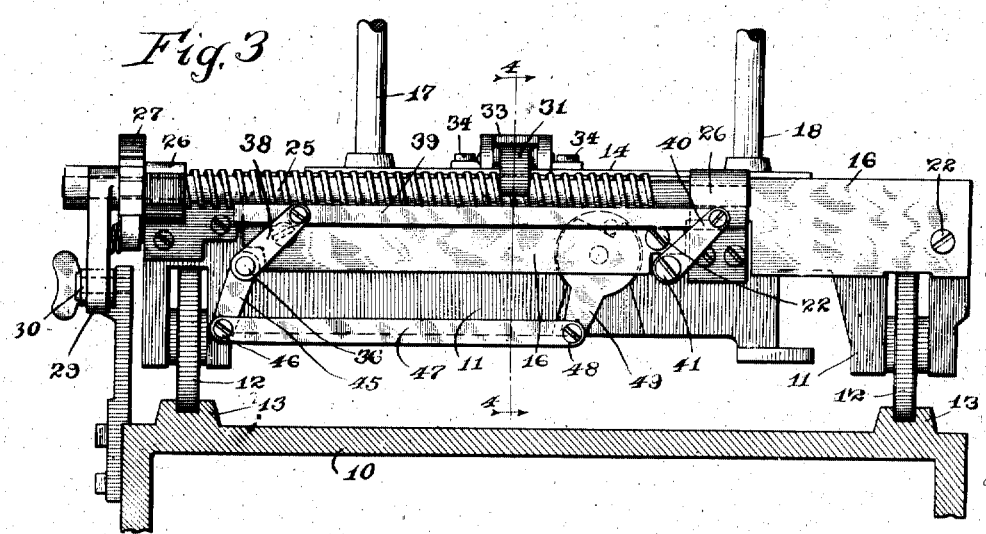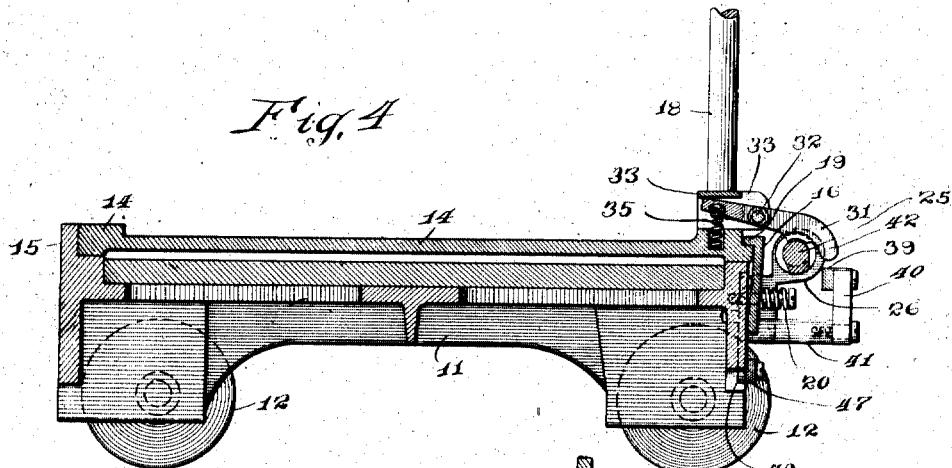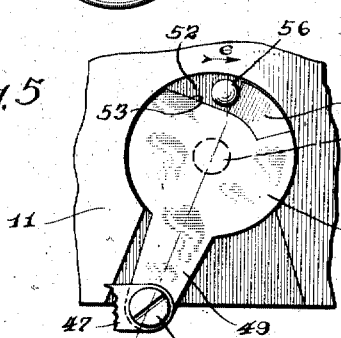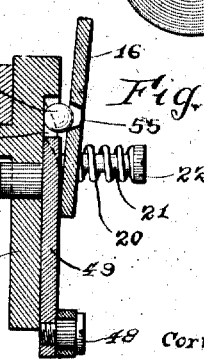

CORNELIS F. M. van BERKEL, OF LAPORTE, INDIANA, ASSIGNOR TO U. S. SLICING MACHINE COMPANY, OF LAPORTE, INDIANA, A CORPORATION OF INDIANA.

SLICING-MACHINE.

1,280,111.　　　Specification of Letters Patent.　　Patented Sept. 24, 1918.

Application filed July 5, 1917. Serial No. 178,735.

*To all whom it may concern:*

Be it known that I, CORNELIS F. M. VAN BERKEL, a subject of the Queen of the Netherlands, residing at Laporte, in the county of Laporte and State of Indiana, have invented certain new and useful Improvements in Slicing-Machines, of which the following is a specification.

This invention relates to machines for slicing meat and similar materials, and has for its object the provision of a machine of the class named which shall be of improved construction and more efficient and convenient in operation than similar devices previously known.

The invention is exemplified in the combination and arrangement of parts shown in the accompanying drawings and described in the following specification, and it is more particularly pointed out in the appended claims.

In the drawings, Figure 1 is a top plan view of a supporting table for a slicing machine embodying the present invention, Fig. 2 is a fragmentary view showing the table in Fig. 1 in elevation, Fig. 3 is an elevation looking from the right in Fig. 2, Fig. 4 is a vertical section on line 4—4 of Fig. 3, Fig. 5 is a fragmentary elevational view showing a detail of construction, and Fig. 6 is a section on line 6—6 of Fig. 5.

The numeral 10 designates the frame of a slicing machine of ordinary construction on which a table 11 is mounted for reciprocatory movement having rollers 12 resting in runways 13 of the frame 10. By its reciprocating movement the table 11 carries the meat to the slicing knife. The meat itself rests upon the sliding meat plate 14 which is held between vertical guides 15 and 16, the meat being clamped to the plate 14 by a clamp carried on upright posts 17 and 18 and not shown in the drawings. The upright guide plate 16, shown at the right of the drawing in Fig. 4, is not rigidly fixed to the table 11, as is the guide 15, but is resiliently pressed against the meat plate 14 by springs 20 which surround bolts 21 threaded into the table 11 and provided with heads 22 against which one end of the springs 20 abut to cause the springs to bear upon the lateral surface of the guide plate 16. The plate 16 is provided with an overhanging ledge 19 which holds the meat plate 14 from upward movement during the slicing operation. By this arrangement the plate 16 is continually held resiliently against the edge of the meat plate 14 and the plate is forced into contact with the guide 15 at the opposite edge thereof. This arrangement compensates for any wear on the guides or plate and insures proper feeding of the plate without any lateral play.

The plate 14 is fed forwardly toward the edge of the table 11, after each slice has been severed, by a screw 25 mounted in bearings 26 carried by the table 11 and provided with a ratchet wheel 27, by means of which a slight rotation is imparted to the screw at each movement of the reciprocating table. The ratchet wheel 27 is operated by a pawl 28 mounted on an arm 29 which strikes an adjustable stop 30 secured to the main frame 10 of the machine. The amount of rotation of the ratchet 27 may be regulated by adjusting the position of the stop 30. A mutilated nut 31 is pivotally mounted at 32 in brackets 33 fastened to the plate 14 by screws 34 and a coiled spring 35 holds the nut resiliently in mesh with the threads of the screw.

In order that the table 14 may be readily adjusted between the guides 15 and 16, mechanism is provided for removing the half nut 31 from engagement with the screw 26 and for simultaneously releasing the pressure exerted by the spring plate 16 against the edge of the plate. A shaft 36 extends transversely across the table 11 and is journaled for oscillation in bearings carried thereby and is provided with a crank 37 at one of its ends by means of which it may be oscillated. The opposite end of the shaft 36 carries an arm 38 rigidly secured to the shaft and carrying a bar 39 pivotally mounted on the end thereof. The opposite end of the bar 39 is pivotally supported by a second arm 40 mounted to oscillate upon a pin 41 carried by the table 11. The bar 39 is located just below an extension 42 on the half nut 31 and in position to engage the extension 42 when the arms 38 and 40 are rotated toward a vertical position. From this construction, it will be apparent that by movement of the crank 37, the bar 39 can be raised to engage the projection 42 of the half nut 31 to lift the half nut out of mesh with the screw 26 and thus free the table 14 so that it may be slid between its guides. In order to release the table from the frictional engagement of the spring plate 16 during such sliding movement, the shaft 36 has also connected therewith mechanism for relieving pressure of the spring plate against the meat table. This mechanism includes an arm 45 rigidly secured to the shaft 36 and projecting downwardly therefrom. The lower end of the arm 45 is pivotally connected at 46 with a link 47 which has its opposite end pivoted at 48 to a cam lever 49. The cam lever 49 (Figs. 5 and 6) operates a cam disk 50 pivoted at 51 to the table 11. The cam 50 is mounted in a recess 52 formed in the side of the table and is provided with a cut-away portion 53, one wall of which cut-away portion is provided with a long bevel 54, as shown in the drawings. The spring plate 16, adjacent the cut away portion 53 of the cam 50, is provided with a depression 55 which holds an anti-friction ball 56. When the cam 50 is in the position shown in Figs. 5 and 6, the ball 56 is held loosely between the plate 16 and the table 11 so that the pressure of the springs 20 is received by the meat plate 14 and not by the ball 56. When the shaft 36 however is rotated to release the half nut 31, the beveled surface 54 will be forced beneath the ball 56 and the ball will thus be forced away from the table and caused to exert pressure on the inner side of the plate 16 to overcome the pressure of the springs 20 and thus move the spring plate away from the edge of the meat plate 14. In this way the meat plate is freed from frictional engagement by the plate 16 at the same time that the half nut 31 is moved out of mesh with the screw 26 and the meat plate 14 is thus enabled to be moved freely along its guides into any position desired by the operator. If the crank 37 is moved a sufficient amount the overhanging ledge 19 may be entirely disengaged from the meat plate 14 so that the plate may be freely lifted from its position on the machine if it is desirable to replace the plate with another which carries meat of a different character.

I claim:—

1. In a slicing machine, a support for the material to be sliced, resilient means for holding said support in position, and mechanism for moving said resilient means out of operative relation with said support to permit adjustment of said support.

2. In a slicing machine, a support for the material to be sliced, a guide on which said support is movably mounted, resilient means for holding said support firmly in contact with said guide, and mechanism for releasing said resilient means to permit free movement of said support relative to said guide.

3. In a slicing machine, a plate for supporting material to be sliced, a guide on which said plate is mounted to slide, resilient means for holding said plate in contact with said guide to prevent lost motion and take up wear, and mechanism for releasing said resilient means at the will of the operator to permit free movement of said plate along said guide.

4. In a slicing machine, a plate for supporting material to be sliced, a guide upon which said plate is mounted for sliding movement and against which said plate bears at one edge thereof, a spring pressed guide arranged to bear against the opposite edge of said plate and to press said plate resiliently against said first named guide to prevent lost motion and to take up wear, and means for forcing said spring plate away from said supporting plate to permit free movement of said supporting plate into different adjusted positions.

5. In a slicing machine, a plate for supporting material to be sliced, a fixed guide for one edge of said plate, a movable guide for the opposite edge of said plate, and means for forcing said movable guide out of contact with said plate to permit free removal of said plate from said machine.

6. In a slicing machine, a plate for holding material to be sliced, a guide for said plate arranged to hold said plate in position on said machine, and means for releasing said guide to permit easy removal of said plate from said machine.

7. In a slicing machine, a plate for holding material to be sliced, a guide for one edge of said plate arranged to overhang said edge to hold said plate in position upon said machine, and means for releasing said guide to permit ready removal of said plate from said machine.

8. In a slicing machine, a plate for holding material to be sliced, a fixed guide for one edge of said plate, a movable guide arranged to engage the opposite edge of said plate and to overhang said edge to hold said plate in position upon said machine, resilient means for forcing said guide into contact with said plate and for holding said plate against said fixed guide to prevent lost motion and to take up wear, and means for forcing said movable guide away from said plate to permit ready removal of said plate from said machine.

9. In a slicing machine, a support for material to be sliced, feeding mechanism for moving said support relative to said machine, resilient means arranged to press against said support, and mechanism for simultaneously releasing said resilient means from said support and for disengaging said feeding mechanism from said support.

10. In a slicing machine, a support for material to be sliced, feeding mechanism for moving said support relative to said machine, a spring pressed guide for said support, and means for simultaneously disengaging said feeding mechanism and said guide from said support to permit easy adjustment of said support relative to said machine.

11. In a slicing machine, a plate for supporting material to be sliced, a guide for said plate, a screw for moving said plate along said guide, resilient means for engaging said plate to hold said plate firmly in contact with said guide, and mechanism for disengaging said plate and screw from one another and for simultaneously releasing the pressure of said resilient means upon said plate to permit ready adjustment of said plate upon said machine.

12. In a slicing machine, a sliding plate for holding material to be sliced, a fixed guide for one edge of said plate, a spring pressed guide arranged to bear against the opposite edge of said plate and press said plate against said fixed guide, a screw for feeding said plate along said guide, means connected with said plate for engaging said screw to transmit movement from said screw to said plate, and mechanism for simultaneously disconnecting said screw from said engaging means and for releasing the pressure of said resilient means upon said plate.

13. In a slicing machine, a support for material to be sliced, a guide for said support, resilient means for holding said guide in contact with said support, and a cam for releasing the pressure of said resilient means upon said support to permit ready adjustment of said support relative to said machine.

14. In a slicing machine, a plate for supporting material to be sliced, a fixed guide for one edge of said plate, a movable guide for the opposite edge of said plate, springs for forcing said movable guide into contact with said plate to hold said plate firmly against said fixed guide, a screw for feeding said plate along said guides to move the material carried by said plate into position to be sliced, a half nut arranged to engage said screw, and mechanism for simultaneously disengaging said half nut from said screw and for releasing the pressure of said resilient guide upon said plate independently of the position of said plate along said guides.

15. In a slicing machine, a plate for holding material to be sliced, a fixed guide for one edge of said plate, a movable guide arranged to engage the opposite edge of said plate, resilient means for forcing said movable guide into contact with the said plate for holding said plate against said fixed guide to prevent lost motion and to take up wear, and means for forcing said movable guide away from said plate to permit easy movement of said plate relative to said guides.

In testimony whereof I have signed my name to this specification, on this 2nd day of July, A. D. 1917.

CORNELIS F. M. van BERKEL.